US010909826B1

(12) United States Patent
Solh et al.

(10) Patent No.: US 10,909,826 B1
(45) Date of Patent: Feb. 2, 2021

(54) SUPPRESSION OF VIDEO STREAMING BASED ON TRAJECTORY DATA

(71) Applicant: Amazon Technologies, Inc., Seattle, WA (US)

(72) Inventors: Mashhour Solh, San Jose, CA (US); Amr Bakry, Santa Clara, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 119 days.

(21) Appl. No.: 15/968,337

(22) Filed: May 1, 2018

(51) Int. Cl.
| | |
|---|---|
| H04N 5/225 | (2006.01) |
| H04N 7/18 | (2006.01) |
| G08B 13/196 | (2006.01) |
| H04N 5/232 | (2006.01) |

(52) U.S. Cl.
CPC .  *G08B 13/19645* (2013.01); *G08B 13/19608* (2013.01); *H04N 5/23241* (2013.01); *H04N 7/181* (2013.01)

(58) Field of Classification Search
CPC ........ G08B 13/19645; G08B 13/19608; H04N 7/181
See application file for complete search history.

(56) References Cited

U.S. PATENT DOCUMENTS

| | | | | |
|---|---|---|---|---|
| 7,450,735 B1* | 11/2008 | Shah | ........................ | G06T 7/292 348/143 |
| 2004/0252194 A1* | 12/2004 | Lin | ........................ | H04N 7/181 348/169 |
| 2004/0257444 A1* | 12/2004 | Maruya | ................... | H04N 7/181 348/169 |
| 2004/0263625 A1* | 12/2004 | Ishigami | ................ | H04N 7/181 348/152 |
| 2005/0057653 A1* | 3/2005 | Maruya | ............ | G08B 13/19608 348/159 |
| 2008/0130949 A1* | 6/2008 | Ivanov | ............... | G06K 9/00771 382/103 |
| 2010/0157064 A1* | 6/2010 | Cheng | .................... | H04N 5/247 348/169 |
| 2011/0157368 A1* | 6/2011 | Jo | .......................... | H04N 7/181 348/159 |

(Continued)

OTHER PUBLICATIONS

Geitgey; Machine Learning is Fun! Part 4: Modern Face Recognition with Deep Learning; Jul. 24, 2016; Retrieved from https://medium.com/©ageitgey/machine-learning-is-fun-part-4-modern-face-recognition-with-deep-learning-c3cffc121d78 on May 1, 2018; 20 pgs.

(Continued)

*Primary Examiner* — Mainul Hasan
(74) *Attorney, Agent, or Firm* — K&L Gates LLP

(57) ABSTRACT

Techniques are generally described for suppressing video streaming based on trajectory information. First video data captured at a first time may be received from a first camera device. A determination may be made that the first video data includes image data representing a previously-identified human. A determination may be made that first trajectory data associates movement of the previously-identified human with the first camera device at the first time. A signal may be sent to a second camera device. The signal may be effective to suppress streaming of video captured by the second camera device during a second time following the first time.

23 Claims, 8 Drawing Sheets

(56) References Cited

U.S. PATENT DOCUMENTS

| | | | | |
|---|---|---|---|---|
| 2012/0169882 | A1* | 7/2012 | Millar | H04N 7/181 |
| | | | | 348/159 |
| 2014/0218532 | A1* | 8/2014 | Nerayoff | G06K 9/00791 |
| | | | | 348/148 |
| 2014/0347475 | A1* | 11/2014 | Divakaran | G06K 9/00771 |
| | | | | 348/135 |
| 2016/0266577 | A1* | 9/2016 | Kerzner | G08B 15/00 |
| 2018/0146169 | A1* | 5/2018 | Siminoff | G06F 40/40 |
| 2018/0308243 | A1* | 10/2018 | Justice | G06T 7/246 |

OTHER PUBLICATIONS

Wikipedia contributors; "Passive Infrared Sensor"; *Wikipedia, The Free Encyclopedia*; Apr. 16, 2018, Retrieved from https://en.wikipedia.org/wiki/Passive_infrared_sensor on May 1, 2018; 6 pgs.

\* cited by examiner

| Trajectory | Person | First Location / Time | Second Location / Time | ... | Final Location / Time |
|---|---|---|---|---|---|
| 160a | 150a | Camera device 120b / 07:45 – 08:01 | Camera device 120c / 07:46 – 08:02 | | Camera device 120g / 08:22 – 08:45 |
| 160b | 150b | Camera device 120a / 17:45 – 18:01 | Camera device 120c / 17:46 – 18:02 | | Camera device 120e / 17:46 – 20:05 |
| 160c | 150c | Camera device 120f / 20:01 | N/A | | Camera device 120g / 20:18 |
| 160d | 150b | Camera device 120a / 07:15 – 07:21 | Camera device 120c / 07:16 – 07:23 | | Camera device 120d / 07:16 – 08:43 |

SUPPRESSION OF VIDEO STREAMING BASED ON TRAJECTORY DATA

BACKGROUND

Security camera systems may use a camera and/or a set of cameras to capture video data of areas of interest. For example, security cameras may be positioned so as to surveil an entryway into a secure area such as a bank vault or an entrance to a private residence. Security camera systems sometimes use motion detection to initiate video capture and/or video streaming to one or more other devices. For example, upon detection of motion in video data, a camera may be configured to send a live feed of video from the camera to a cloud-based server system and/or to a mobile application executing on a mobile phone. In other examples, upon detection of motion in video data, a camera may begin storing captured video data in a data storage repository.

BRIEF DESCRIPTION OF DRAWINGS

FIG. 2B is a diagram illustrating example trajectory data, in accordance with various embodiments of the present disclosure.

DETAILED DESCRIPTION

Figure 1:
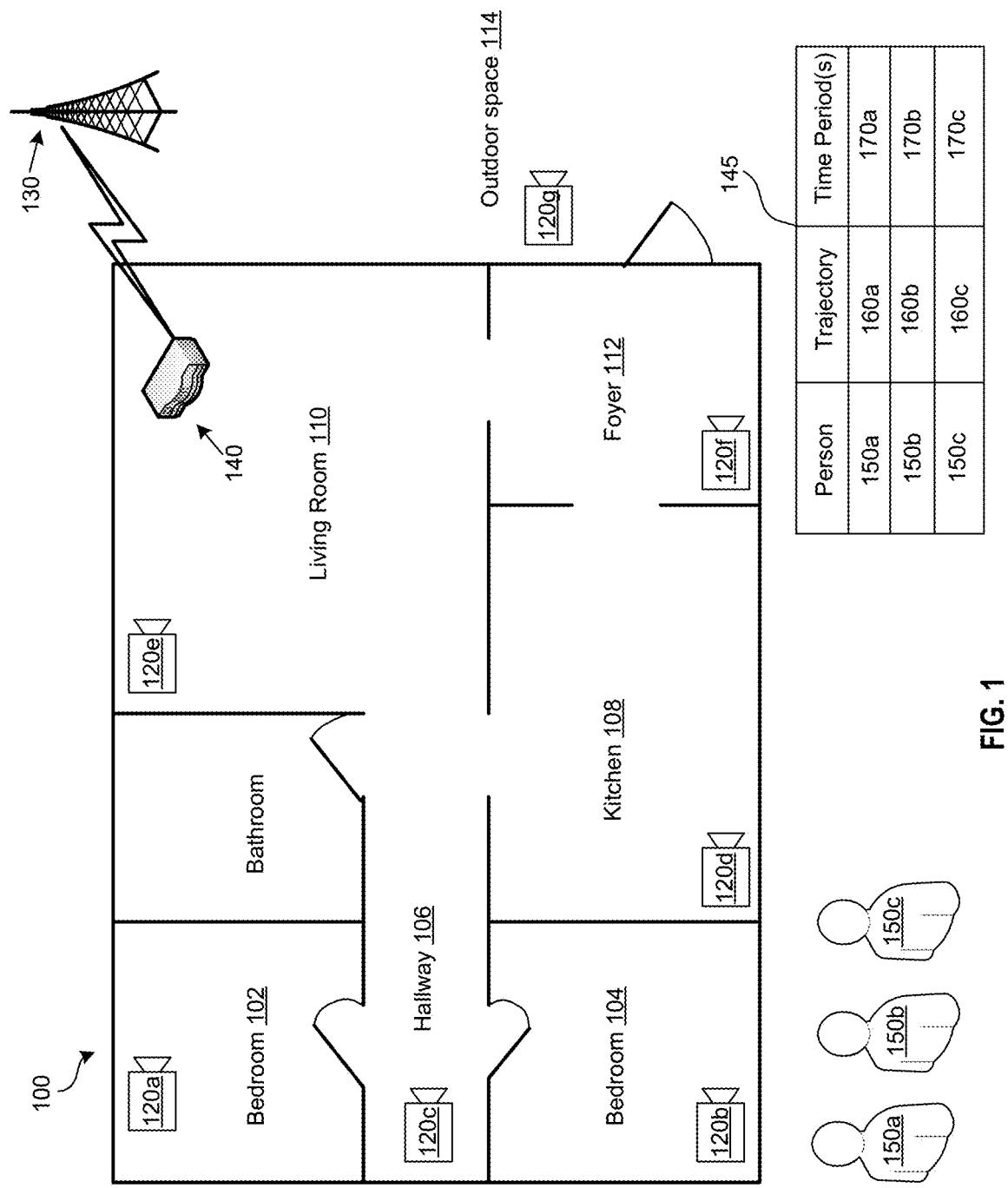
FIG. 1 is a diagram illustrating a building with a camera system installed therein, in accordance with various aspects of the present disclosure.

In the following description, reference is made to the accompanying drawings which illustrate several embodiments of the present invention. It is understood that other embodiments may be utilized and mechanical, compositional, structural, electrical operational changes may be made without departing from the spirit and scope of the present disclosure. The following detailed description is not to be taken in a limiting sense, and the scope of the embodiments of the present invention is defined only by the claims of the issued patent.

In various examples, a location such as an office building, home, outdoor space, and/or any other physical location or combination of physical locations may be monitored by one or more camera devices. In various examples, camera devices may include passive infrared (PIR) sensors effective to detect infrared (IR) radiation emitted by objects within the PIR sensors' fields-of-view. The PIR sensors may be used to detect motion within the environment monitored by the PIR sensors. Accordingly, in some examples, the PIR sensors may be referred to herein as "PIR motion detectors". In various examples, a PIR sensor may be effective to determine when an object passes through a PIR sensor's field-of-view by determining differential changes in the detected IR. PIR sensors often include two sensor "halves". The differential change is the difference in detected radiation between the two sensor halves. If the differential changes caused by an IR-radiating object entering the field-of-view (resulting in a positive differential change in detected IR) and/or leaving the field-of-view (resulting in a negative differential change in detected IR) of the PIR sensor are above a threshold value (typically a tunable threshold referred to as the "sensitivity" of the PIR sensor), the PIR sensor may output a signal indicating that motion has been detected. PIR sensors may be passive in the sense that they may not include any IR light source and may detect radiation emitted from objects within the sensor's field-of-view without subjecting such objects to IR light projected by the sensor.

In various examples, if motion is detected in an environment monitored by one or more camera devices and/or one or more PIR sensors, the triggered PIR sensor (e.g., the PIR sensor detecting motion) may send a signal to one or more camera devices associated with the PIR sensor. The signal may be effective to cause the camera device(s) to begin capturing image data and/or video data. For example, a PIR sensor and a camera device may be situated in a particular room of a building. If the PIR sensor is triggered (e.g., due to a human walking through the room), the PIR sensor may send a signal to the camera device indicating that motion has been detected by the PIR sensor. In response to receipt of the signal from the PIR sensor, the camera may begin capturing video. In various examples, the camera device may include a wireless and/or a wired transmitter and may send the captured video (e.g., may "stream" the video) to one or more other devices for playback, processing, and/or storage. For example, the camera device may stream the video to a mobile device of a user associated with the building and/or the room of the building. In some other examples, the camera device may send the video to a central processing device that may be effective to take one or more actions such as storing the video data in one or more memories, processing the video data, sending the video data to one or more other devices, and/or sending an indication or alert indicating that motion has been detected in the environment monitored by the camera device and/or providing optional access to video captured by the camera device. In various examples, the central processing device may be located within the same building or grouping of buildings as the camera device(s); however, in some other examples, the central processing device may be remotely located from the camera device(s) and may communicate with the camera device(s) over a wide area network (WAN) such as the Internet.

In at least some examples, the PIR sensor(s) may be integrated into the camera device(s). However, in other examples, the PIR sensor(s) may be separate from the camera device(s) and may communicate with the camera device(s) and/or with a central processing device configured in communication with the camera(s) using a wired and/or a wireless communication technology. For example, the PIR sensor(s) may communicate with the camera device(s) and/or with a central processing device via a short-range communication protocol such as Bluetooth® or Bluetooth® Low Energy (BLE). In various other examples, the PIR sensor(s) may communicate with the camera device(s) and/or with a central processing device using a wireless local area network (WLAN) using, for example, the IEEE 802.11 standard.

In at least some examples, the PIR sensor(s) and/or the camera device(s) may be battery powered. However, in some examples, the PIR sensor(s) and/or the camera device(s) may be battery powered and/or powered using a wired connection to a power source (e.g., a wall socket). In various examples, a central processing device (or multiple central processing devices) may be effective to communicate with the camera device(s) using a wired and/or wireless connection. For example, the central processing device may communicate with the camera device(s) using a wireless network such as a WLAN via the 900 MHz band. In some examples, the central processing device may be effective to receive user requests (e.g., from a user mobile device and/or from a companion application on a user mobile device) to access image data and/or video data that is accessible via the central processing device. For example, the central processing device may receive a request from a mobile device (e.g., a mobile device authenticated to the central processing device) for particular video data captured by a particular camera device at a particular time. In the example, the central processing device may stream the video to the authenticated mobile device. In some other examples, an authenticated mobile device may request a live video feed from one or more camera device(s). In the example, the central processing device may be effective to control the relevant camera device(s) to begin capturing video data. The central processing device may be effective to have the relevant camera device(s) stream the video data to the requesting mobile device. In other embodiments, the relevant camera device(s) may send the video data to the central processing device which may, in turn, stream the video to the requesting mobile device (after video processing, for example). In at least some examples, the central processing device may be powered by a wired connection to a wall outlet or other power source.

In at least some examples, detection of motion by a PIR sensor may trigger streaming by one or more camera device(s) associated with the PIR sensor. PIR devices may trigger the camera device(s) to stream even when the motion is not of interest to a user. For example, if the camera system is being used to monitor a family dwelling (e.g., in a video surveillance environment), every time a family member walks through the field-of-view of a camera device and/or PIR sensor, the camera device may stream video data to a central processing device, a cloud-based system, and/or to a mobile device. In some examples, monitoring common activities of family members (and/or other habitual movements of individuals associated with the monitored location) may not be of interest to a user of the camera system. In scenarios where the camera device(s) are battery powered, excessive streaming due to movement of individuals associated with the monitored location may waste battery charge and may result in more frequent battery replacement.

In accordance with various techniques described herein, a central processing device may be effective to determine the identities of individuals and/or pets associated with a monitored location. Additionally, in some examples, the central processing device may be effective to determine trajectories of movement commonly associated with one or more of the identified individuals associated with the monitored location. Upon learning a trajectory of an individual that is associated with the location (e.g., a family member, employee, friend, authorized person, etc.), the central processing device may send a suppression signal to one or more of the camera devices associated with the trajectory. Additionally, when a user requests from the central processing device a live camera stream of a particular person, the user need not search every video feed for a person associated with a trajectory. Instead, the central processing device may be able to determine, based on stored trajectory information for the particular individual, a most likely location of the individual during a given time period. Accordingly, initially, only the camera device associated with the predicted (e.g., the most common) location may be activated to begin streaming video data, rather than activating all camera devices and/or having the user manually toggle through one or more camera devices until the person or other object of interest is located. Accordingly, the various techniques described herein may reduce power consumption of the camera device(s) by reducing the amount of video streamed by one or more camera devices. In various examples, reducing power consumption in accordance with the techniques described herein may significantly prolong battery life. For example, the various techniques described herein may lead to an increase in battery life of up to 10-20 times relative to previous technologies.

FIG. 1 is a diagram illustrating a building 100 with a camera system installed therein, in accordance with some embodiments of the present disclosure. In FIG. 1, the building 100 may be a residential dwelling with a bedroom 102, a bedroom 104, a hallway 106, a bathroom, a kitchen 108, a living room 110, a foyer 112, and a monitored outdoor space 114. Camera devices 120*a*, 120*b*, 120*c*, 120*d*, 120*e*, 120*f*, and 120*g* may be associated with various areas of building 100. For example, camera device 120*a* may be positioned so as to monitor all or a portion of bedroom 102. Camera device 120*b* may be positioned so as to monitor all or a portion of bedroom 104. Camera device 120*c* may be positioned so as to monitor all or a portion of hallway 106. Camera device 120*d* may be positioned so as to monitor all or a portion of kitchen 108. Camera device 102*e* may be positioned so as to monitor all or a portion of living room 110. Camera device 102*f* may be positioned so as to monitor all or a portion of foyer 112. Camera device 120*g* may be positioned so as to monitor all or a portion of outdoor space 114. In various examples, more or fewer camera devices may be used to monitor a given area, in accordance with the desired implementation.

In some examples, camera devices 120*a*, 120*b*, 120*c*, 120*d*, 120*e*, 120*f*, and/or 120*g* may include PIR sensors effective to detect motion within a field-of-view of the PIR sensors. In various other examples, camera devices 120*a*, 120*b*, 120*c*, 120*d*, 120*e*, 120*f*, and/or 120*g* may be configured in communication with one or more PIR sensors. In the example depicted in FIG. 1, a central processing device 140 is situated in living room 110. Central processing device 140 may be a computing device including at least one processor and a computer-readable non-transitory memory. In various examples, central processing device 140 may be effective to communicate with camera devices 120*a*, 120*b*, 120*c*, 120*d*, 120*e*, 120*f*, and/or 120*g*. For example, central processing device 140 may communicate with camera devices 120*a*, 120*b*, 120*c*, 120*d*, 120*e*, 120*f*, and/or 120*g* over a local area network (LAN). For example, camera devices 120*a*, 120*b*, 120*c*, 120*d*, 120*e*, 120*f*, and/or 120*g* may communicate with central processing device 140 wirelessly through a wireless router in building 100. In some other examples, central processing device 140 may be remotely located from building 100. For example, central processing device 140 may be a computing device accessible over a network such as the internet. Additionally, in some examples, central processing device 140 may be a distributed computing environment where various functions are performed by one device, while various other functions are performed by one or more other devices. In at least some examples, central processing device 140 may be effective to communicate wirelessly with one or more other devices 130 over a wide area network, such as the Internet. For example, as described in further detail below, in some examples, central processing device 140 may send alerts and/or notifications to one or more user devices associated with users of the monitoring systems described herein (e.g., one or more camera device(s), PIR sensors, and/or central processing device(s)). In at least some examples, such alerts and/or notifications may be sent to mobile devices via, for example, a wireless base station 130. In other examples, central processing device 140 may trigger one or more other computing devices to send alerts and/or notifications.

Person 150*a*, person 150*b*, and person 150*c* may be associated with building 100. For example, persons 150*a*, 150*b*, and 150*c* may be a family living in building 100. Central processing device 140 may be effective to recognize and identify person 150*a*, person 150*b*, and person 150*c*, or any other person, in accordance with the various techniques described herein. Additionally, central processing device 140 may be effective to determine trajectories of people, pets, and/or objects associated with building 100. A trajectory may be, for example, a physical path taken by a person or persons. For example, central processing device 140 may determine that person 150*a* tends to leave bedroom 102, walk through hallway 106, enter kitchen 108, leave kitchen 108, enter living room 110, enter foyer 112, and exit building 100 to enter outdoor space 114. Additionally, central processing device 140 may associate a time period (e.g., a time of day from 00:00:00 to 23:59:59) or a range of times, with each monitored area in a given trajectory. For example, for the example trajectory described above, central processing device 140 may determine that person 150*a* leaves bedroom 102 between 07:45:00 and 08:00:00. Similarly, central processing device 140 may determine that person 150*a* enters kitchen between 07:46:00 and 08:01:15, etc. Central processing device 140 may store the trajectory in association with the relevant time periods, and in association with the relevant person (e.g., person 150*a* in the example) in a data structure 145. It should be appreciated that the above time periods are by way of example only and that different time periods may be associated with trajectories in accordance with various embodiments of the present disclosure. Additionally, in at least some examples, time periods associated with a trajectory may indicate an average time at which motion is detected in a particular monitored area (and/or by a particular camera device or devices) for the trajectory.

In accordance with various aspects of the present disclosure, central processing device 140 may learn and store various trajectories associated with different persons over different time periods in data structure 145. Accordingly, in the example depicted in FIG. 1, central processing device may store trajectory data 160*a* in association with person 150*a* and time period(s) 170*a* in data structure 145. Similarly, central processing device 140 may store trajectory 160*b* in association with person 150*b* and time period(s) 170*b*. Central processing device 140 may store trajectory 160*c* in association with person 150*c* and time period(s) 170*c*, etc. Central processing device 140 may store multiple trajectories in association with each identified person. Additionally, processing device 140 may store one or more trajectories in association with one or more pets or other objects (e.g., cleaning robots, etc.).

In accordance with the various techniques described herein, when motion is detected by a PIR sensor associated with a particular camera device, and the motion corresponds to a particular trajectory for a previously identified person, the camera device associated with the triggered PIR sensor and/or the camera devices downstream from triggered PIR sensor in terms of the particular trajectory may be suppressed. Suppressed cameras may not capture video data (or image data) and/or may not stream captured image or video data to central processing device 140. Accordingly, power consumed by the consumed by the camera devices may be reduced due to the suppression.

Figure 2A:
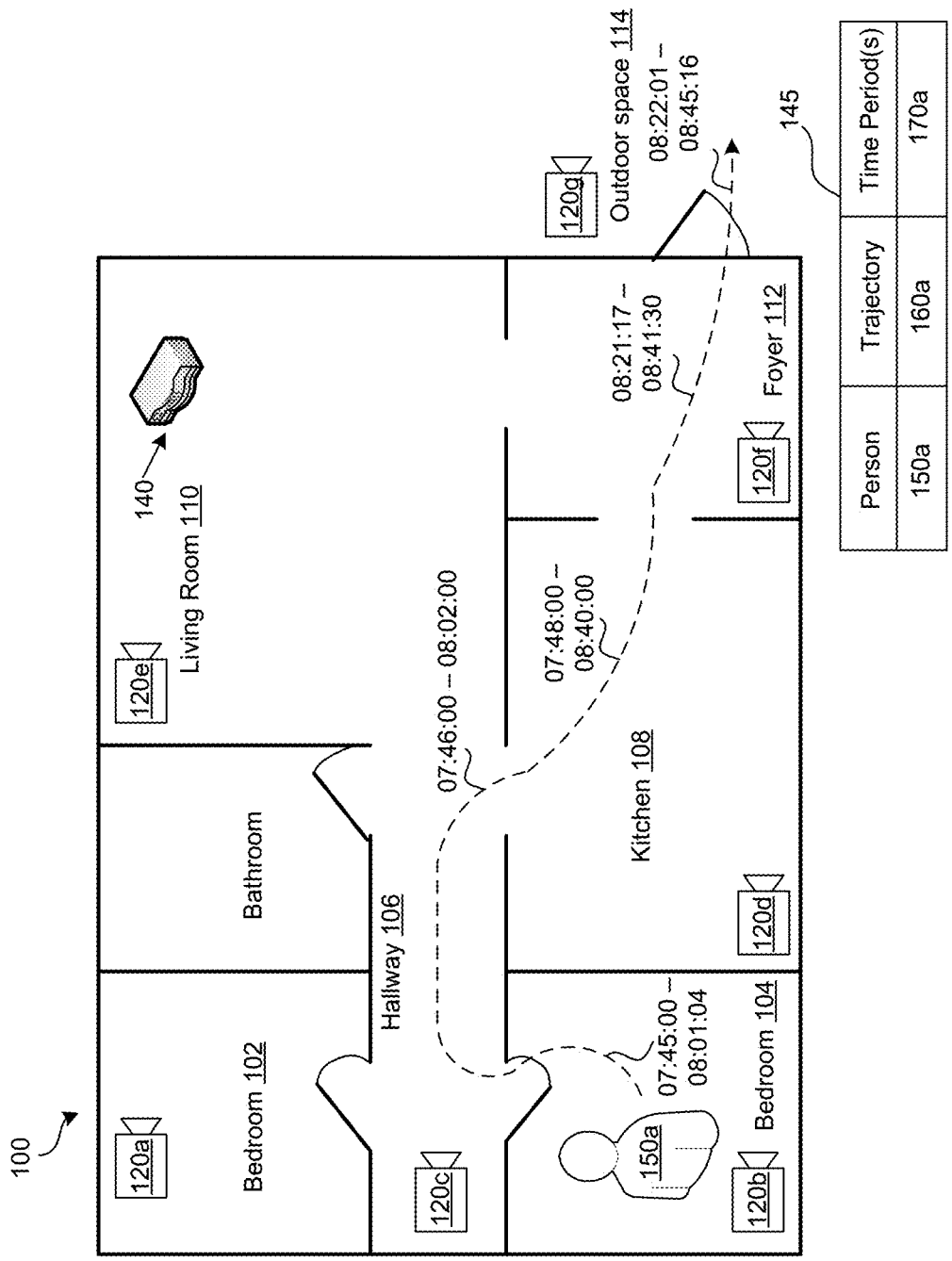
FIG. 2A is a diagram illustrating an example trajectory, in accordance with various embodiments of the present disclosure.

FIG. 2A depicts an example trajectory of person 150*a* in building 100, in accordance with various aspects of the present disclosure. In the example depicted in FIG. 2A, trajectory data 160*a* may be stored in data structure 145 for person 150*a*. Additionally, trajectory data 160*a* may be associated with time periods 170*a*, as described below. In trajectory data 160*a*, person 150*a* may begin in bedroom 104. In trajectory data 160*a*, person 150*a* may be in bedroom 104 from between 7:45:00 and 08:01:04. This time range may be an example of a portion of the time period(s) 170*a* associated with trajectory data 160*a* during which motion of an identified person (e.g., person 150*a*) is detected in a particular monitored area (e.g., bedroom 104). It should be appreciated that data structure 145 need not store time ranges as depicted in FIG. 2A. In various other embodiments, data structure 145 may store an average time during which a person (and/or pet or other object) is active within a particular monitored area. Additionally, data structure 145 may store tolerance information in association with such average times (e.g., +/−1 minute, 2 minutes, 45 seconds, 5 minutes, etc.).

In the example trajectory data 160*a* depicted in FIG. 2A, person 150*a* may leave bedroom 104 and may enter hallway 106. In the example, person 150*a* may be active (e.g., may be moving) in hallway 106 from 07:46:00-08:02:00. In various examples, the time range 07:46:00-08:02:00 may indicate a range of time in which person 150*a* is typically active within hallway 106 during trajectory data 160*a*. As such, person 150*a* may not be moving within hallway 106 during the entire time range from 07:46:00-08:02:00. Thereafter, in trajectory data 160*a*, person 150*a* may leave hallway 106 and enter kitchen 108. Person 150*a* may be active within kitchen 108 from 07:48:00-08:40:00. Thereafter, in trajectory data 160*a*, person 150*a* may leave kitchen 108 and may enter foyer 112. Person 150*a* may be active within foyer 112 from between 08:21:17 and 08:41:30. Thereafter, in trajectory data 160*a*, person 150*a* may leave the building 100 and may enter outdoor space 114. Person 150*a* may be active within the monitored portion of outdoor space 114 (e.g., the portion of outdoor space 114 within the filed-of-view of camera device 120*g*) from between 08:22:01 and 08:45:16.

In the example depicted in FIG. 2A, central processing device 140 may have previously learned an identity of person 150*a* and may have previously learned to recognize person 150*a* based on video data and/or image data representing person 150*a* captured by one or more of camera devices 120*a*, 120*b*, 120*c*, 120*d*, 120*e*, 120*f*, 120*g*, or some other camera devices. When a PIR sensor associated with camera device 120*b* detects the motion of person 150*a* at a time period associated with trajectory data 160*a* (e.g., between 07:45:00 and 08:01:04), the PIR sensor may trigger camera device 120*b* to begin capturing video of bedroom 104 and/or to begin streaming video data to central processing device 140. In some examples, the PIR sensor may send an indication of motion to the relevant camera device in order to trigger the camera device to begin capturing and/or streaming video data. In some examples, along with the video stream, a triggered camera device may send one or more indications of a time period at which the video data was captured (e.g., a time period over which the motion was detected) to the central processing device 140. Central processing device 140 may receive the video data (along with the indication of the time period over which the video data was captured) and may identify person 150*a*, in accordance with person and/or pet recognition techniques described in further detail below. Further, central processing device 140 may determine that identified person 150*a* being active within bedroom 104 (e.g., the portion of the building monitored by camera device 120*b*) during the time period of between 07:45:00 and 08:01:04 corresponds to trajectory data 160*a*. In some other example embodiments, human identification may occur on the camera device or devices detecting the motion (e.g., on camera device 120*b* in the current example) or on some combination of the camera devices and the central processing device 140.

Central processing device 140 may determine that no notification should be sent to a user of the camera monitoring system, based on the detected movement corresponding to a known person moving according to a known trajectory, during a time interval or time period corresponding to the trajectory. Additionally, central processing device 140 may send a signal to all camera devices downstream in the relevant trajectories indicating that video streaming should be suppressed in the event that a PIR is triggered during relevant time intervals within the trajectory. Additionally, in at least some examples, central processing device 140 may be effective to send a signal to the suppressed camera device(s) following the time periods during which streaming is suppressed to instruct the camera device(s) to resume streaming of video upon detection of motion by the camera device(s) and/or by a motion detector (e.g., a PIR sensor) associated with the camera device(s).

To continue the example in FIG. 2A, upon recognition that person 150*a* is moving in accordance with trajectory data 160*a* and during the corresponding time periods 170*a*, central processing device 140 may determine that no notification or alert message should be sent to any persons and/or devices associated with the camera monitoring system of building 100 in response to person 150*a* moving according to trajectory data 160*a*. Additionally, central processing device 140 may send a signal to camera devices 120*c*, 120*d*, 120*f*, and 120*g* indicating that video streaming should be suppressed in the event that PIRs associated with these camera devices are triggered during relevant time intervals within trajectory data 160*a*. For example, if a PIR associated with camera device 120*c* is triggered between 07:46:00 and 08:02:00, streaming of video data by camera device 120*c* to central processing device 140 may be suppressed. Similarly, if a PIR associated with camera 120*d* is triggered between 07:48:00 and 08:40:00, streaming of video data by camera device 120*d* to central processing device 140 may be suppressed, and so on.

In another example, if the person moving is a previously-unidentified person (e.g., as determined by a human identification algorithm executing on central processing device 140 and/or on camera device(s) 120*a*, 120*b*, 120*c*, 120*d*, 120*e*, 120*f*, and/or 120*g*), no suppression signal may be sent to downstream camera device, even if the unidentified person is moving according to a known trajectory. Additionally, an alert and/or notification may be sent to a user of the camera monitoring system indicating that an unknown person is moving within the monitored locations. The alert and/or notification may provide an option for the user to view video of the unidentified person. The video may be streamed from the relevant camera device to central processing device and to a mobile device of the user. As described in further detail below, upon detection of an unidentified person, a human identification algorithm may generate representation data (e.g., a vector) representing the unidentified person in a feature space and may store the representation data in a memory in association with an identifier for the person (e.g., a variable name corresponding to the representation data representing the previously-unidentified person).

FIG. 2B depicts an example data structure 145 depicting trajectory data, in accordance with various aspects of the present disclosure. The various information stored in data structure 145 in association with trajectories 160*a*, 160*b*, 160*c*, and 160*d*, etc., may be referred to as "trajectory data". As shown in FIG. 2B, various trajectories (e.g., trajectory 160*a*, 160*b*, 160*c*, 160*d*, etc.) may be associated with one or more persons (e.g., persons 150*a*, 150*b*, and 150*c*). In the example shown in FIG. 2B, trajectory 160*a* is associated with person 150*a*. In trajectory 160*a*, person 150*a* may be associated with movement within a first location at a first time. In particular, in trajectory 160*a*, person 150*a* may be associated with movement within a field-of-view of camera device 120*b* between the times of 07:45 and 08:01. Similarly, in trajectory 160*a*, person 150*a* may be associated with movement within a field-of-view of camera device 120*c* during the time interval 07:46-08:02. Trajectory 160*a* may conclude with person 150*a* moving within a field-of-view of camera device 120*g* between the time interval 08:22 and 08:45. Accordingly, for a given trajectory, trajectory data associates a particular person (or object) with one or more camera devices during particular times (e.g., time periods, ranges of time, times of day, average times, etc.).

For a given trajectory, a person may be associated with a camera device insofar as the person is expected to be moving within a field-of-view of that camera device during a particular time. Additionally, although in FIG. 2B, trajectories 160*a*, 160*b*, 160*c*, and 160*d* are depicted as being each associated with a single person, in some examples, trajectories may be associated with multiple persons and/or with objects (e.g., a cleaning robot). Additionally, a single person may be associated with multiple different trajectories. For example, in FIG. 2B, person 150*b* is associated with trajectories 160*b* and 160*d*.

Although, FIG. 2B depicts a "First Location/Time", a "Second Location/Time", and a "Final Location/Time", a particular trajectory may include any number of locations and/or associated times. For example, in trajectory 160*c* associated with person 150*c*, the block for Second Location/Time is marked "N/A" to indicate that trajectory 160*c* includes only a first location (e.g., within a field-of-view of camera 120*f*) and a final location (e.g., within a field-of-view of camera 120*g*). Additionally, although time intervals are shown in some of the trajectories in FIG. 2B, in some other examples, average times may be instead stored. For example, trajectory 160*c* indicates that person 150*c* begins movement within a field-of-view of camera device 120*f* at an average time of 20:01.

When a person is detected moving in accordance with a trajectory stored in data structure 145, suppression signals may be sent to all downstream cameras for the relevant trajectory. For example, central processing device 140 may detect and recognize person 150*b* moving within a field-of-view of camera device 120*a* at a time of 07:17. Central processing device 140 may consult data structure 145 and may determine that person 150*b* is moving according to trajectory 160*d*. Central processing device 140 may send signals to all downstream camera devices in trajectory 160*d* effective to suppress video capture during the relevant times specified by trajectory 160*d* in data structure 145. For example, central processing device 140 may send a first suppression signal to camera device 120*c* effective to suppress video capture by camera device 120*c* from 07:16 to 07:23. Additionally, central processing device 140 may send a second suppression signal to camera device 120*d* effective to suppress video capture by camera device 120*d* from 07:16 to 08:43. Furthermore, if there are any intervening locations between "Second Location/Time" and "Final Location/Time" in trajectory 160*d*, central processing device 140 may send suppression signals to the relevant camera devices monitoring these intervening locations.

However, if person 150*b* deviates from trajectory 160*d* (e.g., by appearing within the field-of-view of a non-suppressed camera device), or if an unknown person is detected within the field-of-view of a non-suppressed camera device, central processing device 140 may send a signal to all camera devices (e.g., camera devices 120*a*, 120*b*, 120*c*, 120*d*, 120*e*, 120*f*, and 120*g*) effective to instruct the camera devices to resume capture and/or streaming of video upon detection of motion.

Figure 3:
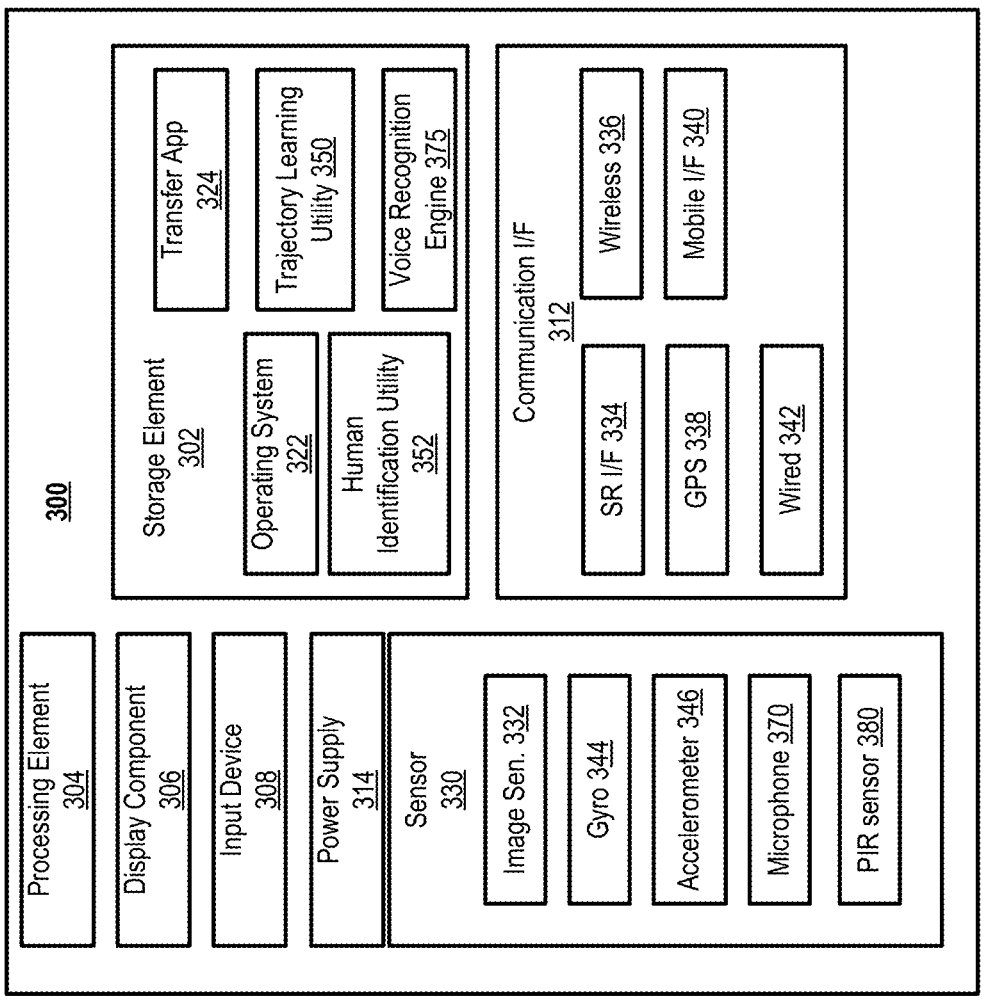
FIG. 3 is a block diagram showing an example architecture of a computing device that may be used in accordance with various aspects of the present disclosure.

FIG. 3 is a block diagram showing an example architecture 300 of a device, such as central processing device 140, camera devices 120*a*, 120*b*, 120*c*, 120*d*, 120*e*, 120*f*, and/or 120*g*, and/or other devices described herein. It will be appreciated that not all devices will include all of the components of the architecture 300 and some user devices may include additional components not shown in the architecture 300. The architecture 300 may include one or more processing elements 304 for executing instructions and retrieving data stored in a storage element 302. The processing element 304 may comprise at least one processor. Any suitable processor or processors may be used. For example, the processing element 304 may comprise one or more digital signal processors (DSPs). The storage element 302 can include one or more different types of memory, data storage, or computer-readable storage media devoted to different purposes within the architecture 300. For example, the storage element 302 may comprise flash memory, random-access memory, disk-based storage, etc. Different portions of the storage element 302, for example, may be used for program instructions for execution by the processing element 304, storage of images or other digital works, and/or a removable storage for transferring data to other devices, etc.

The storage element 302 may also store software for execution by the processing element 304. An operating system 322 may provide the user with an interface for operating the user device and may facilitate communications and commands between applications executing on the architecture 300 and various hardware thereof. A transfer application 324 may be configured to send and/or receive image and/or video data to and/or from other devices (e.g., between camera devices 120*a*, 120*b*, 120*c*, 120*d*, 120*e*, 120*f*, and/or 120*g* and central processing device 140 and/or between the camera devices and/or central processing device 140 and one or more remotely located computing devices). In some examples, the transfer application 324 may also be configured to upload the received images to another device that may perform processing as described herein (e.g., a mobile device or another computing device). Additionally, the transfer application 324 may be configured to send alerts and/or notifications to one or more mobile computing devices associated with the camera system depicted in FIG. 1. For example, an alert may be sent to a mobile device of a person associated with building 100 when one or more of the camera devices 120*a*, 120*b*, 120*c*, 120*d*, 120*e*, 120*f*, and/or 120*g* have detected motion. The alert and/or notification may provide an option for a live stream of video and/or a portion of recorded video captured by one or more of the camera devices 120*a*, 120*b*, 120*c*, 120*d*, 120*e*, 120*f*, and/or 120*g* that have detected motion.

In various examples, a human identification utility 352 may be effective to receive image data and/or video data representing humans (sometimes referred to herein as "human image data"). Human identification utility 352 may be effective to compare the received image data and/or video data to a repository of image data and/or video data in order to identify a particular human from among other humans. In various examples, particular humans may be associated with a particular monitored location. For example, as previously described, person 150*a*, 150*b*, and 150*c* may be associated with building 100 depicted in FIG. 1. In an example, human identification utility may be effective to receive image data and/or video data representing person 150*a*. The image data and/or video data representing person 150*a* may be used to generate one or more feature vectors representing person 150*a* (sometimes referred to herein as "representation data"). For example, facial recognition algorithms may be used to generate a feature vector representation of a human face detected in the image data and/or video data. In some further examples, bounding blocks around portions of the image data and/or video data representing a human body may be used. Additionally, a histogram of gradients (HoG) may be determined for a portion of the image data and/or video data (e.g., for the portion of the image data representing the human within the bounding boxes). In at least some examples, generation of feature vectors may represent an embedding of the image data and/or video data in the feature space of a machine learning model trained to identify humans. In various examples, the machine learning model may be a convolutional neural network (CNN) or any other suitable model. Additionally, in some examples, during a registration step of the camera system (e.g., a camera system including camera devices 120*a*, 120*b*, 120*c*, 120*d*, 120*e*, 120*f*, 120*g* and/or central processing device 140), the system may prompt a user or users to provide images or videos of the user (e.g., by standing in front of, and at various angles with respect to one or more of camera devices 120*a*, 120*b*, 120*c*, 120*d*, 120*e*, 120*f*, and 120*g*) so that the human identification utility 352 may generate an album of feature space representations for the particular user. Accordingly, when motion is triggered and new image data is captured of a human, one or more classifiers may be used to determine a distance (e.g., a Euclidean distance) in terms of the feature vectors from the stored feature space representations of known (e.g., previously identified) humans. The classifier(s) may determine whether or not the image data and/or video data includes a previously-identified human.

Additionally, instead of providing images for each user, human identification utility 352 may learn identities of users during a training period. For example, in the first two weeks of use, every video stream sent to central processing device 140 may be clustered with videos of the same person being grouped together into a cluster using similarity-matching on images and feature vectors. After the two week (or other suitable time period) training period, each cluster with a sufficient number of videos/images may be assigned a unique identity and the videos/images will be added to an album for that identity. Accordingly, human identification utility 352 may learn the identity of users over time. Thereafter, classifiers may be used to determine whether or not a person moving within the monitored area corresponds to a previously-identified person. Although described above in terms of humans and people, similar techniques may be used to identify pets and/or objects, although different machine learning models and different feature spaces may be used, depending on the particular subject matter to be identified.

In various examples, a trajectory learning utility 350 may be effective to learn trajectories of previously-identified persons (e.g., persons associated with the monitored environment). For example, trajectory learning utility 350 may be effective to learn the trajectory of person 150a depicted in FIG. 2A. In various examples, trajectory learning utility 350 may learn trajectories of identified humans over a trajectory learning period which may be initiated automatically by central processing device 140 (or by another suitable device) manually or upon startup of a camera system. During the trajectory learning period, each time a stream from a camera device to central processing device 140 is initiated, central processing device 140 may store an identity of the person triggering the motion detector, a time at which the person is active in the monitored location (e.g., a time at which motion is triggered and/or a time interval over which the person is active in the monitored location), and a location at which the person is active (e.g., Person 150a, bedroom 104, 07:45:00-08:01:30) in a data structure (e.g., within data structure 145, which may be stored in, for example, storage element 302).

Trajectory learning utility 350 may use graph optimization to determine the most prevalent trajectories for particular individuals. A cascade of trajectory trees (discussed in further detail below in reference to FIG. 5) may be used to determine each trajectory associated with each identified person. In the trajectory trees, each node may be a monitored area (e.g., bedroom 104 and hallway 106 may each be examples of a node for the camera system depicted in FIGS. 1 and 2). Trajectory learning utility 350 may determine a number of occurrences of each node in a particular trajectory. The number of occurrences may be used as weighting factor to determine the trajectories with the highest probability for a given individual. In various examples, trajectory learning utility 350 may comprise one or more machine learning models that may be trained to learn trajectories for each individual. In some examples, use of long short term memory (LSTM) models may be advantageous due to the sequential nature of a human trajectory within a monitored location.

In various examples, if an unidentified person is detected and/or a previously unidentified trajectory for an identified person is detected, trajectory learning utility 350 may learn a new trajectory. In at least some examples, trajectories that are unused over a period of time (e.g., 2 weeks, 1 month, 3 days, or any other suitable period of time) may be deleted to avoid suppressing video streaming for unusual trajectories that may be of interest to users.

When implemented in some user devices, the architecture 300 may also comprise a display component 306. The display component 306 may comprise one or more light-emitting diodes (LEDs) or other suitable display lamps. Also, in some examples, the display component 306 may comprise, for example, one or more devices such as cathode ray tubes (CRTs), liquid-crystal display (LCD) screens, gas plasma-based flat panel displays, LCD projectors, raster projectors, infrared projectors or other types of display devices, etc.

The architecture 300 may also include one or more input devices 308 operable to receive inputs from a user. The input devices 308 can include, for example, a push button, touch pad, touch screen, wheel, joystick, keyboard, mouse, trackball, keypad, light gun, game controller, or any other such device or element whereby a user can provide inputs to the architecture 300. These input devices 308 may be incorporated into the architecture 300 or operably coupled to the architecture 300 via wired or wireless interface. In some examples, architecture 300 may include a microphone 370 for capturing sounds, such as voice commands. Voice recognition engine 375 may interpret audio signals of sound captured by microphone 370. In some examples, voice recognition engine 375 may listen for a "wake word" to be received by microphone 370. Upon receipt of the wake word, voice recognition engine 375 may stream audio to a voice recognition server for analysis. In various examples, voice recognition engine 375 may stream audio to external computing devices via communication interface 312.

When the display component 306 includes a touch-sensitive display, the input devices 308 can include a touch sensor that operates in conjunction with the display component 306 to permit users to interact with the image displayed by the display component 306 using touch inputs (e.g., with a finger or stylus). The architecture 300 may also include a power supply 314, such as a wired alternating current (AC) converter, a rechargeable battery operable to be recharged through conventional plug-in approaches, or through other approaches such as capacitive or inductive charging.

The communication interface 312 may comprise one or more wired or wireless components operable to communicate with one or more other user devices. For example, the communication interface 312 may comprise a wireless communication module 336 configured to communicate on a network according to any suitable wireless protocol, such as IEEE 802.11 or another suitable wireless local area network (WLAN) protocol. A short range interface 334 may be configured to communicate using one or more short range wireless protocols such as, for example, near field communication (NFC), Bluetooth, BLE, etc. A mobile interface 340 may be configured to communicate utilizing a cellular or other mobile protocol. A Global Positioning System (GPS) interface 338 may be in communication with one or more earth-orbiting satellites or other suitable position-determining systems to identify a position of the architecture 300. A wired communication module 342 may be configured to communicate according to the USB protocol or any other suitable protocol.

The architecture 300 may also include one or more sensors 330 such as, for example, one or more position sensors, image sensors, and/or motion sensors. An image sensor 332 is shown in FIG. 3. Some examples of the architecture 300 may include multiple image sensors 332. For example, a panoramic camera system may comprise multiple image sensors 332 resulting in multiple images and/or video frames that may be stitched and may be blended to form a seamless panoramic output.

Motion sensors may include any sensors that sense motion of the architecture including, for example, gyro sensors 344, PIR sensors 380, and accelerometers 346. Motion sensors, in some examples, may be used to determine an orientation, such as a pitch angle and/or a roll angle of a camera. The gyro sensor 344 may be configured to generate a signal indicating rotational motion and/or changes in orientation of the architecture (e.g., a magnitude and/or direction of the motion or change in orientation). Any suitable gyro sensor may be used including, for example, ring laser gyros, fiber-optic gyros, fluid gyros, vibration gyros, etc. The accelerometer 346 may generate a signal indicating an acceleration (e.g., a magnitude and/or direction of acceleration). Any suitable accelerometer may be used including, for example, a piezoresistive accelerometer, a capacitive accelerometer, etc. In some examples, the GPS interface 338 may be utilized as a motion sensor. For example, changes in the position of the architecture 300, as determined by the GPS interface 338, may indicate the motion of the GPS interface 338.

Figure 4:
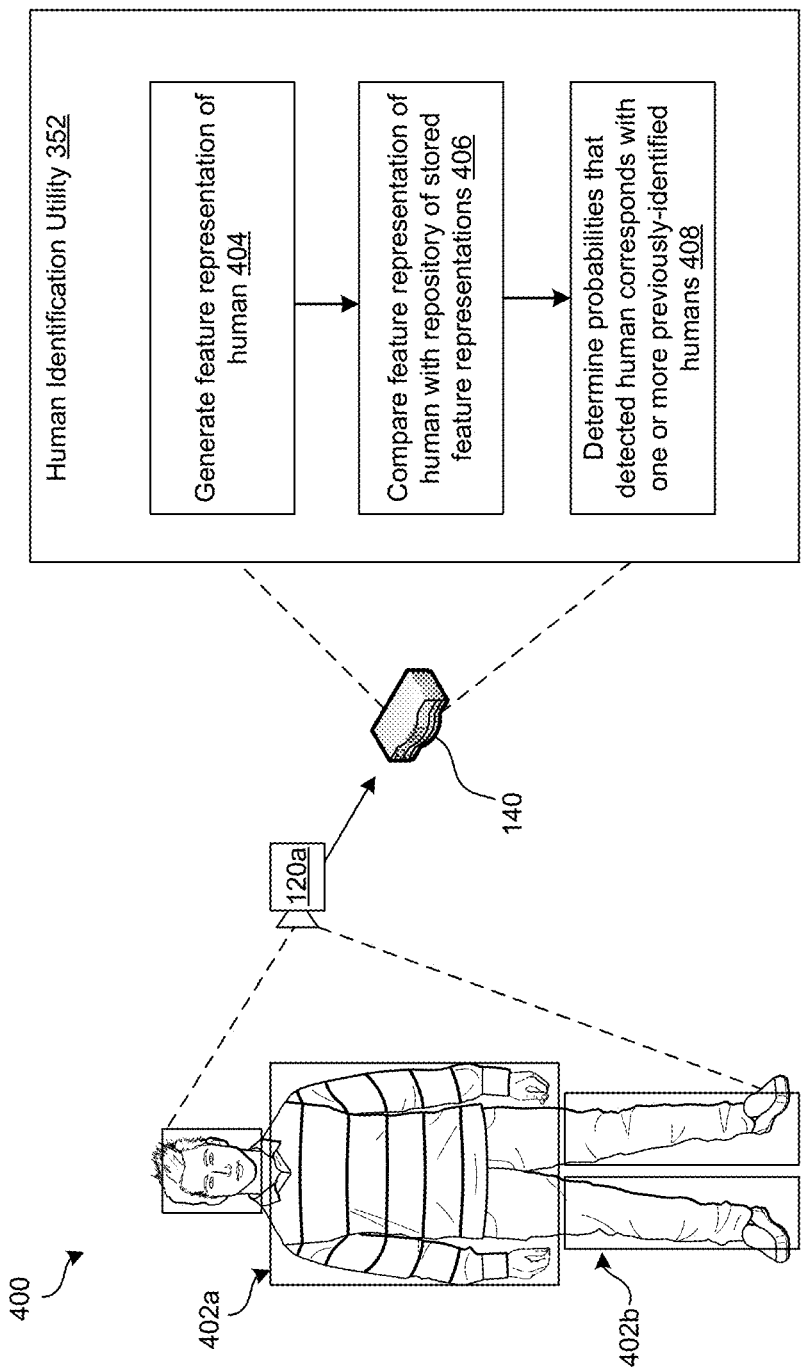
FIG. 4 depicts an example of human identification, in accordance with various embodiments of the present disclosure.

FIG. 4 depicts an example of human identification, in accordance with various embodiments of the present disclosure. In various examples, human identification may be performed by, for example, a human identification utility 352. Human identification utility 352 may be executed in whole, or in part by, one or more of the camera devices (e.g., camera devices 120a-120g of FIG. 1) of a camera monitoring system, by central processing device 140, and/or by one or more other computing devices.

In various examples, human identification utility 352 may be effective to receive image data and/or video data representing humans. For example, video data captured by camera device 120a may comprise a frame 400 of image data. Frame 400 of image data may comprise a representation of a human (e.g., person 150a). Human identification utility 352 may be effective to compare the received image data and/or video data to a repository of image data and/or video data in order to identify the particular human from among other humans. In various examples, particular humans may be associated with a particular monitored location. For example, as previously described, person 150a, 150b, and 150c may be associated with building 100 depicted in FIG. 1. In an example, human identification utility 352 may be effective to receive image data and/or video data representing person 150a (e.g., frame 400 of image data). The image data and/or video data representing person 150a may be used to generate one or more feature vectors representing a depicted person (e.g., person 150a). For example, bounding boxes (such as bounding boxes 402a, 402b) may be used to bound image data (e.g., pixels and/or blocks of image data) representing portions of a human (such as a human face and/or a human body). In some examples, facial recognition algorithms may be used to generate a feature vector representing a human face detected in the image data and/or video data. In some further examples, a histogram of gradients (HoG) may be determined for a portion of the image data and/or video data (e.g., for the portion of the image data representing the human within the bounding boxes) to generate a feature vector representing a human detected in image data. Generally, at action 404, human identification utility 352 may generate a feature representation of a human. At action 406, human identification utility 352 may compare the feature representation of the human with a repository of stored feature representations of previously-identified humans. For example, human identification utility 352 may determine a distance (e.g., a Euclidean distance) between the feature vector representing the human in frame 400 with feature vectors of previously-identified humans stored in memory. Human identification utility 352 may thereafter be effective to determine probabilities that the detected human corresponds to one or more previously-identified humans at action 408. In various examples, if the probability is above a particular threshold probability (e.g., 70%, 80% or some other value), human identification utility 352 may determine that the human detected in frame 400 corresponds to a previously-identified human. In some other examples, if the detected human does not correspond to one or more previously-identified humans stored in the memory, human identification utility 352 may create a new entry for the feature vector representing the human detected in frame 400 and may store the feature vector in the memory in association with an identifier identifying the feature vector (and thus the human) from among other feature vectors representing other humans.

In at least some examples, generation of feature vectors may represent an embedding of the image data and/or video data in the feature space of a machine learning model trained to identify humans. In various examples, the machine learning model may be a convolutional neural network (CNN) or any other suitable model. Additionally, in some examples, during a registration step of the camera system (e.g., a camera system including camera devices 120a, 120b, 120c, 120d, 120e, 120f, 120g and/or central processing device 140), the system may prompt a user or users to provide images or videos of the user (e.g., by standing in front of one or more of camera devices 120a, 120b, 120c, 120d, 120e, 120f, and 120g) so that the human identification utility 352 may generate an album of feature space representations for the particular user.

Accordingly, when motion is triggered and new image data is captured of a human, one or more classifiers may be used to determine a distance in terms of the feature vectors from the stored feature space representations of known (e.g., previously identified) humans. The classifier(s) may determine whether or not the image data and/or video data includes a previously-identified human.

Additionally, instead of providing images for each user, human identification utility 352 may learn identities of users during a training period. For example, in the first two weeks of use, every video stream sent to central processing device 140 may be clustered with videos of the same person being grouped together into a cluster using similarity-matching on images and feature vectors. After the two week (or other suitable time period) training period, each cluster with a sufficient number of videos/images may be assigned a unique identity and the videos/images will be added to an album for that identity. Accordingly, human identification utility 352 may learn the identity of users over time. Thereafter, classifiers may be used to determine whether or not a person moving within the monitored area corresponds to a previously-identified person. Although described above in terms of humans and people, similar techniques may be used to identify pets and/or objects, although different machine learning models and different feature spaces may be used, depending on the particular subject matter to be identified.

Figure 5:
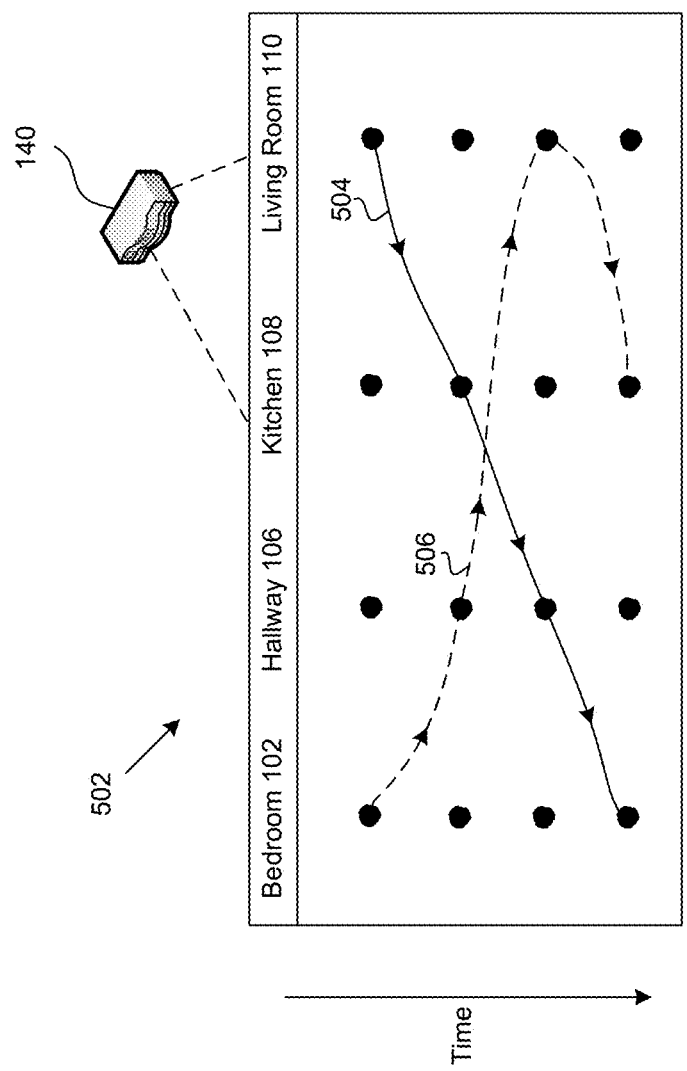
FIG. 5 depicts example trajectories for an individual, in accordance with various embodiments of the present disclosure.

FIG. 5 depicts example trajectories for an individual, in accordance with various embodiments of the present disclosure. FIG. 5 depicts a graph of two trajectories for a particular individual previously identified by central processing device 140. For example, trajectories 504, 506 of graph 502 may be specific to person 150c of FIG. 1. A cascade of trajectory trees may be used to determine all trajectories for each individual. In various examples, a number of occurrences of each node can be used as weighting factor to help determine trajectories with the highest probability. For example, the probability, based on a number of occurrences, that person 150c is in kitchen 108 at 08:00:00 may be ⅗ (0.60) and the probability, based on a number of occurrences, that person 150c is in hallway 106 at 08:00:00 may be ⅕ (0.20). The probability that person 150c is in living room 110 at 08:01:00 may be ⅗ (0.60), and the probability that person 150c is in kitchen 108 at 08:01:00 may be ⅕ (0.20). Accordingly, the optimized trajectory may be: kitchen 108 at 08:00:00 and living room 110 at 08:01:00 (e.g., ⅗+⅗).

In various examples, a trajectory learning utility 350 may be effective to learn trajectories of previously-identified persons (e.g., persons associated with the monitored environment). In various examples, trajectory learning utility 350 may learn trajectories of identified humans over a trajectory learning period which may be initiated automatically by central processing device 140 (or by another suitable device) manually or upon startup of a camera system. During the trajectory learning period, each time a stream from a camera device to central processing device 140 is initiated, central processing device 140 may store an identity of the person triggering the motion detector, a time at which the person is active in the monitored location (e.g., a time at which motion is triggered and/or a time interval over which the person is active in the monitored location), and a location at which the person is active (e.g., Person 150a, bedroom 104, 07:45:00-08:01:30) in a data structure (e.g., within data structure 145, which may be stored in, for example, storage element 302).

Trajectory learning utility 350 may use graph optimization to determine the most prevalent trajectories for particular individuals. A cascade of trajectory trees (discussed in further detail below in reference to FIG. 5) may be used to determine each trajectory associated with each identified person. In the trajectory trees, each node may be a monitored area (e.g., bedroom 104 and hallway 106 may each be examples of a node for the camera system depicted in FIGS. 1 and 2). Trajectory learning utility 350 may determine a number of occurrences of each node in a particular trajectory. The number of occurrences may be used as weighting factor to determine the trajectories with the highest probability for a given individual. In various examples, trajectory learning utility 350 may comprise one or more machine learning models that may be trained to learn trajectories for each individual. In some examples, use of long short term memory (LSTM) models may be advantageous due to the sequential nature of a human trajectory within a monitored location.

In the example depicted in FIG. 5, two trajectories may have been learned by trajectory learning utility 350 for person 150c. In first trajectory 504, person 150c starts in living room 110. Next, at some period of time later, person 150c is active in kitchen 108, followed by hallway 106, followed by bedroom 102. In some examples, first trajectory 504 may be a trajectory of person 150c occurring between 20:43:00 and 21:10:00 (e.g., a trajectory occurring during the evening). First trajectory 504 may be represented as trajectory data and may be stored in a data structure (e.g., data structure 145) of a non-transitory computer-readable memory. In at least some examples, trajectory data may generally associate movement of a previously-identified person with one or more camera devices during one or more time periods. For example, first trajectory 504 may associate movement of person 150c with a camera device located in living room 110 at a time between 20:43:00 and 20:44:00. Further, first trajectory 504 may associate movement of person 150c with a camera device located in kitchen 108 at a time between 20:44:00 and 20:48:00, etc.

In second trajectory 506, person 150c may begin in bedroom 102, and may proceed to hallway 106, followed by living room 110, followed by kitchen 108. In some examples, second trajectory 506 may occur over a particular time interval during the morning. It should be appreciated that the example trajectories 504 and 506 are by way of example only. Additionally, each individual identified by central processing device 140 may be associated with one or more trajectories specific to that individual. As described in further detail below, when central processing device 140 determines that a previously-identified individual is moving according to a previously-stored trajectory for that individual, central processing device 140 may send a signal to one or more (e.g., all) downstream camera devices in the trajectory. The signal may indicate to the camera devices that, in the event that a PIR sensor, or other motion sensor, associated with the camera device detects motion during the time period(s) of the relevant trajectory associated with that camera device, that no image data or video data should be streamed by the camera device to central processing device 140.

In various examples, if an unidentified person is detected and/or a previously unidentified trajectory for an identified person is detected, trajectory learning utility 350 may learn a new trajectory. In at least some examples, trajectories that are unused over a period of time (e.g., 2 weeks, 1 month, 3 days, or any other suitable period of time) may be deleted to avoid suppressing video streaming for unusual trajectories that may be of interest to users. However, initially, when a previously-unidentified person is detected by one or more camera devices and/or by central processing device 140, no suppression signal may be sent to the camera devices by central processing device 140. Accordingly, camera devices of the camera system may stream video related to the motion of the previously-unidentified person. Additionally, central processing device 140 may send a notification to a mobile device of a user alerting the user that an unidentified person has been detected in one or more monitored areas. Additionally, the notification may provide an option for a live and/or a pre-recorded video stream of the unidentified person's movements within the monitored area.

Figure 6:
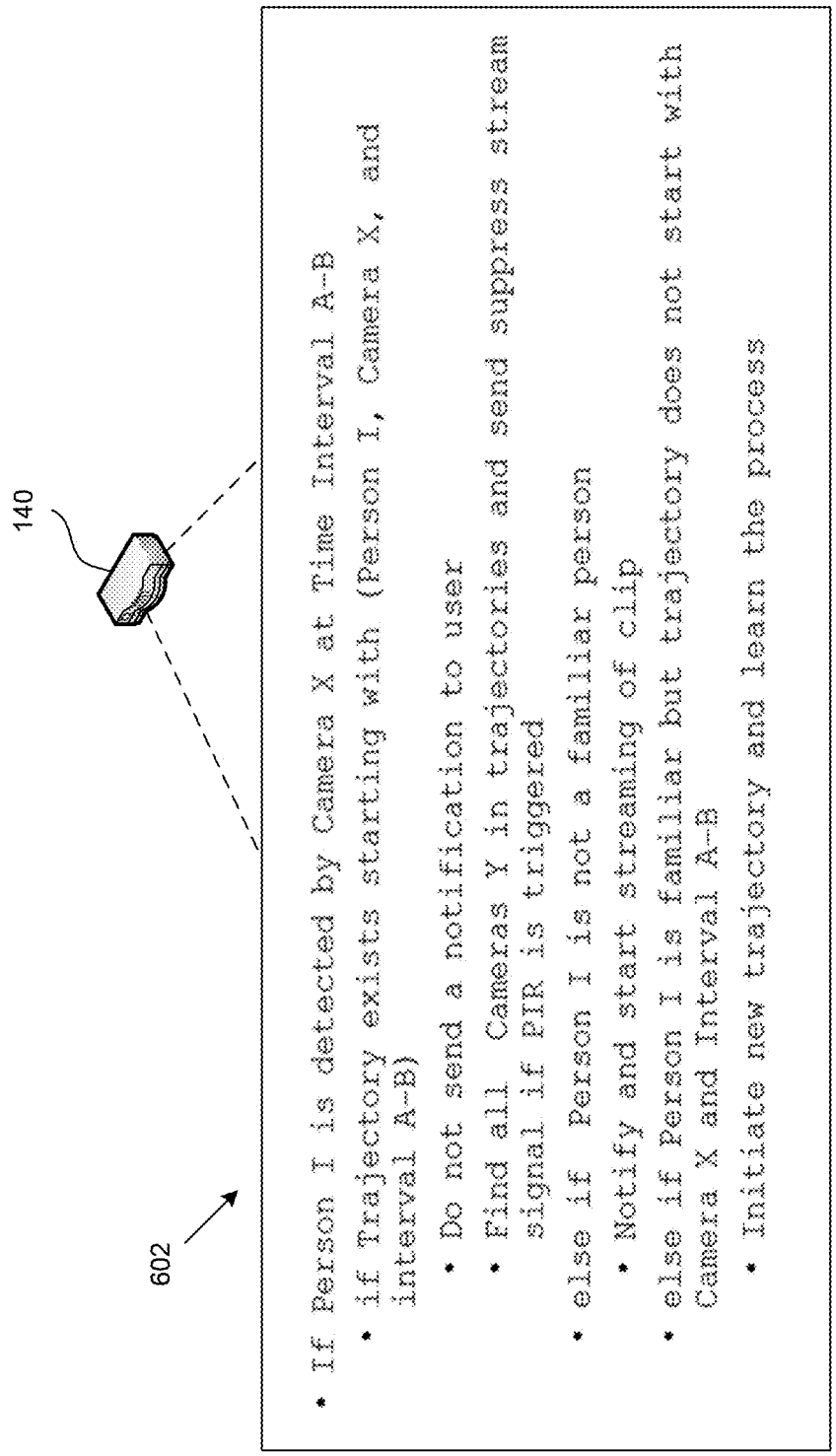
FIG. 6 depicts an example of an algorithm that may be used to determine whether video streaming should be suppressed based on trajectory data, in accordance with embodiments of the present disclosure.

FIG. 6 depicts an example of an algorithm that may be used to determine whether video streaming should be suppressed based on trajectory data, in accordance with embodiments of the present disclosure. In FIG. 6 pseudocode 602 may represent an algorithm that may be used in accordance with the present disclosure. In various examples, central processing device 140 and/or one or more other computing devices may be effective to execute a process flow represented by pseudocode 602. Additionally, pseudocode 602 is shown by way of example only. Different implementations of the various techniques described herein are possible and the example depicted in FIG. 6 is not meant to limit the present disclosure to the particular implementation there depicted.

In the example pseudocode 602, a Person I may be detected by a Camera X at Time Interval A-B. A determination may be made whether or not trajectory data exists that begins with (Person I, Camera X, Time Interval A-B). If so, user notifications may be suppressed. Additionally, all Cameras Y (e.g., camera devices that are expected to detect motion for the currently-invoked trajectory, sometimes referred to herein as "downstream" cameras) may be determined and suppression signals may be sent to all Cameras Y. As previously described, suppression signals may indicate that video streaming should be suppressed in the event that a PIR associated with the one or more Cameras Y are triggered during relevant time intervals within the trajectory.

Else, if Person I is not a familiar person (e.g., if the detected human has not been previously identified), a user of the camera monitoring system may be sent a notification (e.g., a mobile alert, push notification, short message service (SMS) message, and/or the like) and streaming of video from the camera device(s) detecting the movements of the previously-unidentified person may be initiated.

Else, if Person I is familiar (e.g., if the detected human has been previously identified), but the trajectory is unfamiliar (e.g., no currently-stored trajectory for the previously-identified person begins with Camera X and Time Interval A-B), trajectory learning utility 350 may be effective to learn the new trajectory in accordance with the techniques described above in reference to FIG. 5.

Figure 7:
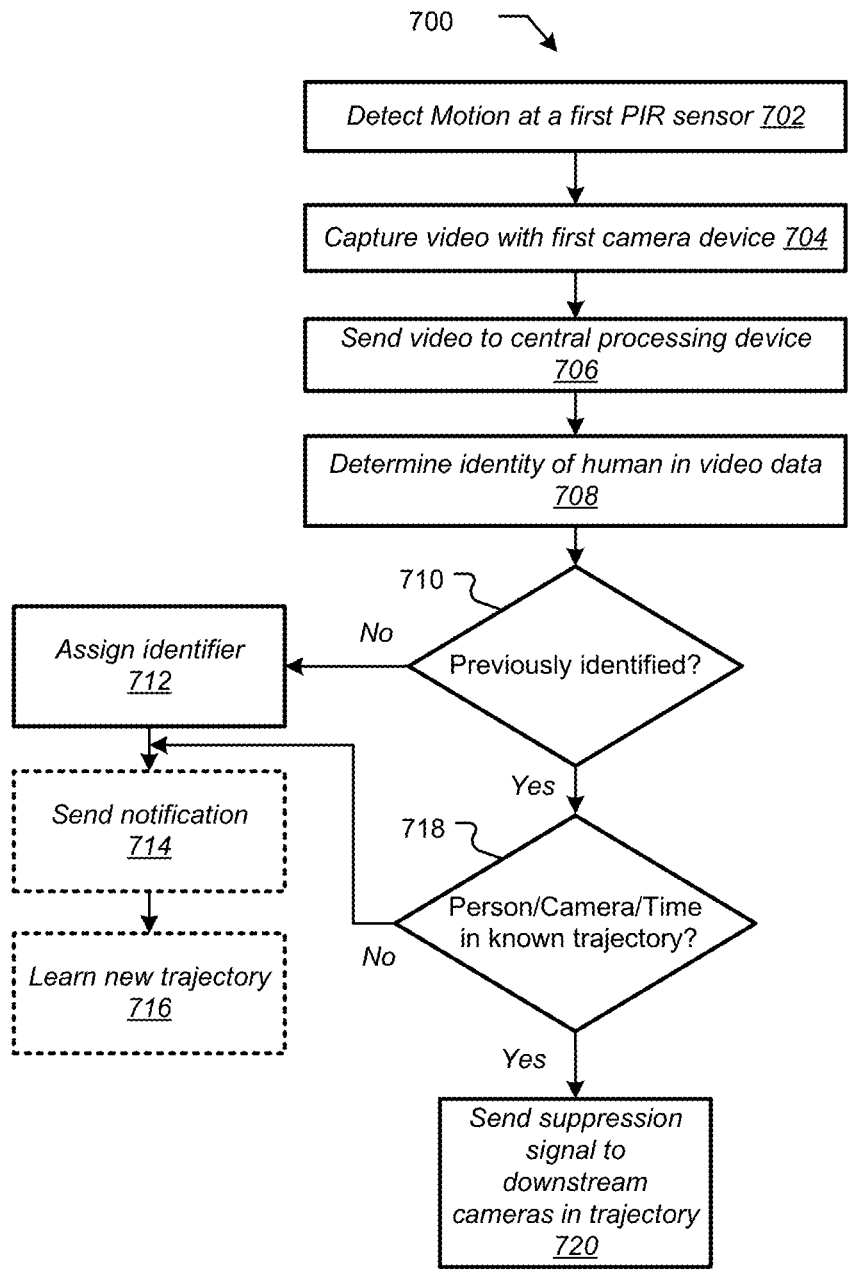
FIG. 7 depicts a flowchart illustrating an example process for suppression of video streaming based on trajectory data, in accordance with various aspects of the present disclosure.

FIG. 7 is a flowchart illustrating an example process 700 that may be used to determine whether video streaming should be suppressed based on trajectory data, in accordance with embodiments of the present disclosure. The actions of the process 700 may represent a series of instructions comprising computer readable machine code executable by a processing unit of a computing device (e.g., by central processing device 140, one or more of the camera devices described herein, some other computing device, and/or some combination thereof). In various examples, the computer readable machine codes may be comprised of instructions selected from a native instruction set of the computing device(s) and/or an operating system of the computing device(s).

The process 700 of FIG. 7 may begin at action 702, "Detect motion at a first PIR sensor". At action 702, a PIR sensor, or other motion detection sensor, may detect motion at a first location in a monitored environment. In various examples, the PIR sensor may be configured in communication with one or more camera device(s) positioned so as to have a field-of-view that monitors all or a portion of the location in which the PIR sensor has detected motion.

The process 700 of FIG. 7 may continue from action 702 to action 704, "Capture video with first camera device". At action 704, a camera device (e.g., camera device 120b of FIG. 2A) may capture video data and/or image data (e.g., one or more frames of image data) in response to the PIR sensor or other motion sensor detecting motion at action 702.

Process 700 may continue from action 704 to action 706, "Send video to central processing device". At action 706, the camera device may be effective to send the captured image data and/or video data to a central processing device (e.g., central processing device 140). In at least some examples, the camera device may be effective to perform the various operations described below. In such examples, the camera device need not send the video to a central processing device. However, in at least some examples, camera devices may be battery powered. Accordingly, the human/object identification processing and trajectory recognition processing steps described herein may consume a significant amount of processing resources and a significant amount of power. As such, in some cases, it may be beneficial to send video to a central processing device that is connected to a power source for the human/object identification processing and/or the trajectory recognition processing. However, in at least some other examples, if minimization of bit rate is an optimization goal, the processing may be done at the camera device capturing the video to conserve bandwidth. In such examples, it may be advantageous to utilize non-battery-powered camera devices in order to avoid relatively quick consumption of battery charge.

Processing may continue from action 706 to action 708, "Determine identity of human in video data". At action 708, human, pet, and/or object detection and identification may be performed. In various examples, a feature vector representation of the human, pet, and/or object may be determined. For example, the techniques described above in reference to FIGS. 3 and 4 may be used. The vector representation in a feature space may be compared to vector representations of previously-identified humans, objects, and/or pets stored in memory. In various examples, a classifier may be used that is trained to identify humans, objects, and/or pets, based on received image and/or video data.

At action 710, a determination may be made whether the human (or object or pet) has been previously identified. If the person, object, or pet has not been previously identified, processing may continue to action 712. At action 712, a new identifier may be assigned to the newly identified human, object, or pet. For example, identifier data may identify the vector representation generated for the human, object, or pet detected in the image data and/or video data captured at action 704. The identifier data may identify the vector representation from among other vector representations representing other persons, pets, or objects stored in memory.

Processing may proceed from action 712 to action 714, "Send notification". At action 714 a notification may be sent to a user and/or a computing device associated with a user of the camera monitoring system described in the present disclosure. In various examples, the notification may alert the user that an unidentified person, pet, or object has been detected within the monitored environment. Additionally, the notification may provide an option to view a live video or may display a live video feed of the unidentified person, object or pet. Additionally, the notification may provide other options, such as an option to alert the police or another emergency management service. In another example, the notification may allow the user to send audio through a microphone of the device receiving the notification that may be sent to one or more speakers within the monitored environment for playback. For example, the user may send audio stating "You are being recorded. Please leave the premises. The authorities are on the way."

In some examples, notifications may be optional. Accordingly, action 714 is displayed with a dashed box to indicate that action 714 may not always be performed in every case. Additionally, when a person, pet, or object that has previously not been identified at action 708 is detected, no suppression signals may be sent to suppress video and/or image capture of camera devices within the monitored environment.

In various examples, processing may optionally proceed from action 714 to action 716. At action 716 a new trajectory may be learned and may be stored in a data structure (e.g., data structure 145 of FIG. 1). Trajectory data may indicate a path taken between one or more monitored locations for a particular person, pet, or object. Additionally, the trajectory data may indicate times at which the person, pet, or object is active (e.g., is moving such that motion is detected by one or more motion detection sensors) within particular monitored locations. A trajectory may be learned over time using one or more machine learning approaches. Action 716 is displayed in a dashed box to indicate that, optionally, action 716 may be omitted from process 700. For example, when a person detected within the monitored environment has not been previously identified (e.g., at action 710), no new trajectory data may be learned for them. In another example, a user may be provided with an option as to whether the user would like new trajectory data to be learned for the detected previously-unidentified person.

If, at action 710, the person has been previously identified, processing may proceed to action 718, at which a determination may be made whether the previously-identified person (or pet or object) is associated with the camera capturing the image/video data at the particular time at which the camera captured the image/video data in a known trajectory. For example, Person A may be a previously-identified person (e.g., a family member in a monitored home environment). The central processing device 140 (or some other device) may have previously learned a first trajectory for Person A. In the first trajectory, person A is active within a living room area monitored by a camera device X at time interval A-B. Next, in the first trajectory, person A may be active within a foyer monitored by a camera device Y at time interval B-C, etc. Accordingly, if it is determined (for example by central processing device 140 or some other device) that camera device X has detected Person A moving within the living room area during time interval A-B, a determination may be made that the previously-identified person (e.g., Person A) is moving according to a known trajectory. In such an example, processing may continue from action 718 to action 720.

At action 720, a suppression signal may be sent to downstream camera devices in the identified trajectory. A suppression signal may be effective to prevent streaming by the downstream camera devices in the relevant trajectory (e.g., streaming to central processing device 140). In some other examples, a suppression signal may be effective to prevent video and/or image capture by the downstream cameras in the identified trajectory during the relevant time periods during which movement is expected within the camera device's field-of-view.). A "downstream" camera device may refer to a camera device for which subsequent motion is expected in the identified trajectory. In the example above, after Person A (a previously-identified person) has been identified as active within the field-of-view of camera device X at time interval A-B, and after these parameters have been identified as corresponding to the first trajectory, the central processing device 140 (or other computing device) may send a suppression signal to all downstream camera devices in the trajectory. In the current example, camera device Y is a downstream camera device according to the first trajectory. Accordingly, the central processing device 140 (or other computing device) may send a suppression signal to camera device Y indicating that streaming (and/or video/image capture) is to be suppressed during the pertinent time interval (e.g., time interval B-C in the current example). Similarly, suppression signals may be sent to any other downstream camera device(s) to suppress streaming and/or capture of video during time periods associated with motion of the identified person in the field-of-view of the relevant downstream camera device(s) in the identified trajectory.

If, at action 718, a determination is made that the previously-identified person (or pet or object) is not associated with the camera capturing the image/video data at the particular time at which the camera captured the image/video data (and is thus not associated with a known trajectory), processing may proceed to action 714.

As previously described, at action 714, a notification may be sent to a user and/or a computing device associated with a user of the camera monitoring system described in the present disclosure. In various examples, the notification may alert the user that motion of a previously-identified person, pet, or object has been detected, but that the motion of the previously-identified person, pet, or object is unusual (e.g., the motion is not associated with a known trajectory). For example, if a child associated with a home is detected as moving within a locked room that contains hazardous items, an alert may be sent to the mobile device of a parent indicating that a previously-identified individual is moving according to an unknown trajectory and/or within a prohibited area. In some examples, the notification may provide an option to view a live video or may display a live video feed of the unidentified person, object or pet. Additionally, the notification may provide other options, such as an option to alert the police or another emergency management service. In another example, the notification may allow the user to send audio through a microphone of the device receiving the notification that may be sent to one or more speakers within the monitored environment for playback. For example, the user may send audio stating "Son, this is your father. Please leave the room and lock the door behind you."

In various examples, notifications may be optional. In some examples, a user may instruct the monitoring system not to send notifications when a previously-identified person is moving according to a new, unknown trajectory. In various examples, the monitoring system may send notifications when a previously-unidentified person is detected, but not when a previously-identified person is detected, even when the previously-identified person is not moving in accordance with a known trajectory. Accordingly, in at least some examples, action 714 may be omitted.

In various examples, processing may optionally proceed from action 714 to action 716. At action 716 a new trajectory may be learned and may be stored in a data structure (e.g., data structure 145 of FIG. 1). Trajectory data may indicate a path taken between one or more monitored locations for a particular person, pet, or object. Additionally, the trajectory data may indicate times at which the person, pet, or object is active (e.g., is moving such that motion is detected by one or more motion detection sensors) within particular monitored locations. A trajectory may be learned over time using one or more machine learning approaches (e.g., one or more LSTMs). In another example, a user may be provided with an option as to whether the user would like new trajectory data to be learned for the previously-identified person.

Among other potential benefits, a system in accordance with the present disclosure may conserve power consumption by reducing streaming from wireless camera devices upon detection of motion that is associated with common trajectories of persons associated with the monitored location. For example, in a home security context, the various techniques described herein may conserve battery power of wireless camera devices by suppressing streaming due to detected motion of family members moving according to common movement patterns (e.g., "trajectories"). Trajectories may be personalized for each individual. Additionally, suppression signals may suppress video streaming for a camera device only for the period of time indicated for the currently invoked trajectory. As such, when a previously-identified person is moving according to a known trajectory, streaming by each camera device may be suppressed only for the time period in which movement is expected in that camera device's field-of-view (according to the known trajectory).

Accordingly, video representing non-routine and/or unusual movements may be streamed while streams of video data representing commonplace movements of trusted individuals may be suppressed in order to conserve battery power. Additionally, the various techniques described herein may allow the monitoring system to automatically determine identities of individuals and to learn the identities of new individuals. Additionally, the various techniques described herein allow the monitoring system to learn new trajectories for different people, pets, and/or objects. Finally, a remote user may request live video of a person, pet, or object associated with camera monitoring system. Instead of toggling through all available fields-of-view of all cameras until the person, object, or pet is located, the monitoring system may consult the trajectory data and may present the field-of-view where the person, object, or pet is most likely to be located based on the current time. Identification of the most likely location of the person, pet, or object may conserve streaming by battery-operated camera devices as the most likely locations of the person, pet, or object may be searched first, according to stored trajectory data.

As set forth above, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments.

It will also be appreciated that various items may be stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be sent as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. The various features and processes described above may be used independently of one another, or may be combined in various ways. All possible combinations and subcombinations are intended to fall within the scope of this disclosure.

In addition, conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Although this disclosure has been described in terms of certain example embodiments and applications, other embodiments and applications that are apparent to those of ordinary skill in the art, including embodiments and applications that do not provide all of the benefits described herein, are also within the scope of this disclosure. The scope of the inventions is defined only by the claims, which are intended to be construed without reference to any definitions that may be explicitly or implicitly included in any incorporated-by-reference materials.

What is claimed is:

1. A method of video surveillance, comprising:
   receiving, from a passive infrared (PIR) motion detector, a first indication of motion at a first location within a monitored environment;
   capturing, by a first image sensor in a first battery-powered camera, first video data of the first location over a first time period;
   sending, by the first battery-powered camera, the first video data and information about the first time period to a central processing device over a wireless network;
   determining, by the central processing device, that the first video data comprises first image data representing a first human;
   generating, by the central processing device, a first vector representation of the first image data;
   determining, by the central processing device, that the first vector representation corresponds to a second vector representation of a previously-identified human, the second vector representation stored in a computer-readable non-transitory memory;
   determining, by the central processing device, that the previously-identified human, the first battery-powered camera, and the first time period correspond to first trajectory data stored in the computer-readable non-transitory memory, wherein the first trajectory data indicates one or more battery-powered cameras that are expected to detect movement of the previously-identified human, and a respective time period for each of the one or more battery-powered cameras during which a respective battery-powered camera of the one or more battery-powered cameras is expected to detect movement of the previously-identified human;
   determining, from the first trajectory data, a second battery-powered camera of the one or more battery-powered cameras and a second time period associated with the second battery-powered camera during which the second battery-powered camera is expected to detect movement of the previously-identified human, the second time period following the first time period; and
   sending a suppression instruction to the second battery-powered camera, wherein the suppression instruction is effective to prevent streaming of any video data by the second battery-powered camera during the second time period.

2. The method of claim 1, further comprising:
receiving, from a second PIR motion detector, a second indication of motion at a second location within the monitored environment;
capturing, by a second image sensor in a third battery-powered camera, second video data of the second location over a third time period;
sending, by the third battery-powered camera, the second video data and a third indication of the third time period to the central processing device over the wireless network;
determining, by the central processing device, that the second video data comprises second image data representing a second human;
generating, by the central processing device, a third vector representation of the second image data;
determining, by the central processing device, that the third vector representation does not correspond to any other vector representations of previously-identified humans stored in the computer-readable non-transitory memory;
generating an identifier for the third vector representation;
storing the identifier in association with the third vector representation in the memory;
receiving, from a third PIR motion detector, a fourth indication of motion at a third location within the monitored environment;
capturing, by a third image sensor in a fourth battery-powered camera, third video data of the third location over a fourth time period, wherein the third video data comprises third image data representing the second human at the third location; and
sending, by the fourth battery-powered camera, the third video data to the central processing device.

3. The method of claim 1, further comprising:
receiving, from a second PIR motion detector, a second indication of motion at a second location within the monitored environment;
capturing, by a second image sensor in a third battery-powered camera, second video data of the second location over a third time period;
sending, by the third battery-powered camera, the second video data and a third indication of the third time period to the central processing device over the wireless network;
determining, by the central processing device, that the second video data comprises second image data representing the first human;
generating, by the central processing device, a third vector representation of the second image data;
determining, by the central processing device, that the third vector representation corresponds to the second vector representation of the previously-identified human;
determining, by the central processing device, that the previously-identified human, the third battery-powered camera, and the third time period do not correspond to any trajectory data stored in the computer-readable non-transitory memory; and
generating, by the central processing device, new trajectory data, wherein the new trajectory data associates the previously-identified human with the third battery-powered camera during the third time period.

4. A method comprising:
receiving first image data captured at a first time from a first camera device, the first camera device being associated with a first location;
determining that the first image data includes a representation of a first human;
determining previously-stored first trajectory data that associates the first human with the first camera device during a first time period including the first time and associates the first human with a second camera device during a second time period following the first time, the second camera device being associated with a second location; and
sending to the second camera device an instruction not to send video data captured by the second camera device during the second time period.

5. The method of claim 4, further comprising:
identifying second image data representing the first human in the first image data;
generating a first feature vector representing the second image data; and
determining that the first feature vector corresponds to a second feature vector stored in a computer-readable non-transitory memory, wherein the second feature vector is associated with the first human.

6. The method of claim 4, further comprising:
receiving second image data captured at a third time from a third camera device, the third camera device being associated with a third location;
determining that the second image data includes a second representation of the first human;
determining that no trajectory data associates the first human with the third camera device at the third time; and
generating second trajectory data associating the first human with the third camera device at the third time.

7. The method of claim 4, further comprising:
receiving second image data captured at a third time from a third camera device, the third camera device being associated with a third location;
determining that the second image data includes a representation of an unidentified human;
receiving third image data captured at a fourth time from a fourth camera device, wherein the third image data includes the representation of the unidentified human; and
sending a notification to a computing device.

8. The method of claim 4, further comprising:
receiving second image data captured at a third time from a third camera device, the third camera device being associated with a third location;
determining that the second image data includes a representation of an unidentified human; and
sending a notification to a computing device in response to the determining that the second image data includes the representation of the unidentified human, wherein the notification comprises an option to display the second image data.

9. The method of claim 4, wherein sending the instruction to the second camera device is based at least in part on the determining that the first trajectory data associates the first human with the second camera device during the second time period.

10. The method of claim 4, further comprising:
determining that the first trajectory data associates the first human with a third camera device during a third time period; and sending to the third camera device a second instruction not to send video data captured by the third camera device during the third time period.

11. The method of claim 4, further comprising:
receiving, from a computing device, a request to view the first human at a current time;
determining second trajectory data that associates the first human with the first camera device during the current time; and
sending video data from the first camera device to the computing device.

12. The method of claim 4, further comprising, following the second time period, sending to the second camera device a second instruction to resume sending of video data upon detection of motion by a sensor associated with the second camera device.

13. A computing device comprising:
at least one processor; and
a computer-readable non-transitory memory storing instructions that when executed by the at least one processor cause the at least one processor to:
receive first image data captured at a first time from a first camera device, the first camera device being associated with a first location;
determine that the first image data includes a representation of a first human;
determine previously-stored first trajectory data that associates the first human with the first camera device during a first time period including the first time and associates the first human with a second camera device during a second time period following the first time, the second camera device being associated with a second location; and
send to the second camera device a suppression instruction not to send video data captured by the second camera device during the second time period.

14. The computing device of claim 13, wherein the instructions, when executed by the at least one processor are further effective to cause the at least one processor to:
identify second image data representing the first human in the first image data;
generate a first feature vector representing the second image data; and
determine that the first feature vector corresponds to a second feature vector stored in the computer-readable non-transitory memory, wherein the second feature vector is associated with the first human.

15. The computing device of claim 13, wherein the instructions, when executed by the at least one processor are further effective to cause the at least one processor to:
receive second image data captured at a third time from a third camera device, the third camera device being associated with a third location;
determine that the second image data includes a second representation of the first human;
determine that no trajectory data associates the first human with the third camera device at the third time; and
generate second trajectory data associating the first human with the third camera device at the third time.

16. The computing device of claim 13, wherein the instructions, when executed by the at least one processor are further effective to cause the at least one processor to:
receive second image data captured at a third time from a third camera device, the third camera device being associated with a third location;
determine that the second image data includes a representation of an unidentified human;
receive third image data captured at a fourth time from a fourth camera device, wherein the third image data includes the representation of the unidentified human; and
send a notification to a second computing device.

17. The computing device of claim 13, wherein the instructions, when executed by the at least one processor are further effective to cause the at least one processor to:
receive second image data captured at a third time from a third camera device, the third camera device being associated with a third location;
determine that the second image data includes a representation of an unidentified human; and
send a notification to a second computing device in response to the determining that the second image data includes the representation of the unidentified human, wherein the notification comprises an option to display the second image data.

18. The computing device of claim 13, wherein sending the suppression instruction to the second camera device is based at least in part on the determination that the first trajectory data associates the first human with the second camera device during the second time period.

19. The computing device of claim 18, wherein the instructions, when executed by the at least one processor are further effective to cause the at least one processor to:
determine that the first trajectory data associates the first human with a third camera device during a third time period; and
send a second to the third camera device a second suppression instruction not to send video data captured by the third camera device during the third time period.

20. The computing device of claim 13, wherein the instructions, when executed by the at least one processor are further effective to cause the at least one processor to:
receive, from a second computing device, a request to view the first human at a current time;
determine second trajectory data that associates the first human with the first camera device during the current time; and
send video data from the first camera device to the second computing device.

21. The method of claim 4, further comprising:
retrieving the previously-stored first trajectory data from a data structure comprising a plurality of trajectory data, wherein the first trajectory data indicating a previously-detected path taken by the first human from the first location to the second location.

22. The method of claim 21, wherein:
the first trajectory data indicates the previously-detected path taken by the first human from the first location during the first time period to the second location during the second time period.

23. The method of claim 4, wherein:
retrieving the previously-stored first trajectory data from a data structure comprising a plurality of trajectory data, wherein each of the plurality of trajectory data indicates a corresponding previously-determined human and a corresponding plurality of camera devices.

* * * * *